(12) United States Patent
Kim et al.

(10) Patent No.: US 8,310,997 B2
(45) Date of Patent: Nov. 13, 2012

(54) APPARATUS AND METHOD FOR DYNAMIC CHANNEL ALLOCATION IN MULTIPLE CHANNEL WIRELESS COMMUNICATION SYSTEM

(75) Inventors: Nam-Gi Kim, Soowon-si (KR); Jae-Hee Cho, Seoul (KR); Jung-Je Son, Seongnam-si (KR); Min-Hee Cho, Soowon-si (KR); Jae-Hyuk Jang, Soowon-si (KR); Jeong-Ho Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 1121 days.

(21) Appl. No.: 12/013,719

(22) Filed: Jan. 14, 2008

(65) Prior Publication Data

US 2008/0170545 A1 Jul. 17, 2008

(30) Foreign Application Priority Data

Jan. 12, 2007 (KR) .................. 10-2007-0003589
Jan. 30, 2007 (KR) .................. 10-2007-0009249

(51) Int. Cl.
*H04W 4/00* (2009.01)
(52) U.S. Cl. ...................... 370/329; 455/450
(58) Field of Classification Search ................ None
See application file for complete search history.

(56) References Cited

U.S. PATENT DOCUMENTS

| | | | | |
|---|---|---|---|---|
| 5,065,431 A * | 11/1991 | Rollett | ............ | 704/243 |
| 6,108,314 A * | 8/2000 | Jones et al. | ............ | 370/294 |
| 7,596,114 B2 * | 9/2009 | Park et al. | ............ | 370/322 |
| 7,664,087 B2 * | 2/2010 | Cho et al. | ............ | 370/338 |
| 7,746,765 B2 * | 6/2010 | Lim et al. | ............ | 370/208 |
| 7,848,295 B2 * | 12/2010 | Kang et al. | ............ | 370/332 |
| 7,873,023 B2 * | 1/2011 | Ihm et al. | ............ | 370/349 |
| 2003/0189918 A1 * | 10/2003 | Das et al. | ............ | 370/349 |
| 2004/0001564 A1 * | 1/2004 | Chan et al. | ............ | 375/341 |
| 2005/0107036 A1 * | 5/2005 | Song et al. | ............ | 455/23 |
| 2005/0117536 A1 * | 6/2005 | Cho et al. | ............ | 370/328 |
| 2005/0250506 A1 * | 11/2005 | Beale et al. | ............ | 455/452.1 |
| 2005/0286408 A1 * | 12/2005 | Jin et al. | ............ | 370/208 |
| 2006/0007849 A1 * | 1/2006 | Kim et al. | ............ | 370/208 |
| 2006/0009228 A1 * | 1/2006 | Kang et al. | ............ | 455/450 |
| 2006/0039274 A1 * | 2/2006 | Park et al. | ............ | 370/208 |
| 2006/0098568 A1 * | 5/2006 | Oh et al. | ............ | 370/206 |
| 2006/0148408 A1 * | 7/2006 | Cho et al. | ............ | 455/67.7 |
| 2006/0285479 A1 * | 12/2006 | Han et al. | ............ | 370/203 |
| 2007/0002958 A1 * | 1/2007 | Chang et al. | ............ | 375/260 |
| 2007/0002977 A1 * | 1/2007 | Cho et al. | ............ | 375/340 |
| 2007/0010268 A1 * | 1/2007 | Kim et al. | ............ | 455/509 |
| 2007/0086474 A1 * | 4/2007 | Lee et al. | ............ | 370/447 |

(Continued)

FOREIGN PATENT DOCUMENTS

KR   1020050089699   9/2005

(Continued)

*Primary Examiner* — Bunjob Jaroenchonwanit
(74) *Attorney, Agent, or Firm* — The Farrell Law Firm, P.C.

(57) ABSTRACT

An apparatus and method for dynamic channel allocation in a multiple channel wireless communication system are provided. The apparatus includes a scheduler for dividing resources to be used for a band Adaptive Modulation and Coding (AMC) channel and a diversity channel, a generator for generating a MAP heading field including physical distribution information on the band AMC channel and the diversity channel, and a mapper for mapping the MAP heading field to a predetermined physical resource region.

25 Claims, 11 Drawing Sheets

U.S. PATENT DOCUMENTS

| | | | |
|---|---|---|---|
| 2007/0097905 A1* | 5/2007 | Suh et al. | 370/328 |
| 2007/0104136 A1* | 5/2007 | Pecen et al. | 370/329 |
| 2007/0140167 A1* | 6/2007 | Jang et al. | 370/329 |
| 2007/0253367 A1* | 11/2007 | Dang et al. | 370/329 |
| 2007/0263735 A1* | 11/2007 | Tong et al. | 375/260 |
| 2007/0286127 A1* | 12/2007 | Inohiza | 370/331 |
| 2008/0020778 A1* | 1/2008 | Pi | 455/450 |
| 2008/0031191 A1* | 2/2008 | Kashima et al. | 370/329 |
| 2008/0049690 A1* | 2/2008 | Kuchibhotla et al. | 370/338 |
| 2008/0080474 A1* | 4/2008 | Kitchin | 370/349 |
| 2008/0095071 A1* | 4/2008 | Lu et al. | 370/254 |
| 2008/0186909 A1* | 8/2008 | Kim et al. | 370/328 |
| 2008/0205364 A1* | 8/2008 | Park et al. | 370/338 |
| 2008/0212531 A1* | 9/2008 | Park et al. | 370/329 |
| 2008/0212692 A1* | 9/2008 | Banerjea et al. | 375/260 |
| 2008/0259856 A1* | 10/2008 | Frederiksen et al. | 370/329 |
| 2008/0291841 A1* | 11/2008 | Joung et al. | 370/252 |
| 2009/0129329 A1* | 5/2009 | Usui | 370/329 |
| 2009/0190537 A1* | 7/2009 | Hwang et al. | 370/329 |
| 2009/0199076 A1* | 8/2009 | Boer et al. | 714/799 |
| 2009/0232084 A1* | 9/2009 | Li et al. | 370/330 |
| 2009/0245196 A1* | 10/2009 | Iseda | 370/329 |
| 2010/0046413 A1* | 2/2010 | Jin et al. | 370/315 |
| 2010/0103828 A1* | 4/2010 | Kuroda et al. | 370/252 |
| 2010/0146353 A1 | 6/2010 | Lim et al. | 714/748 |
| 2010/0189077 A1* | 7/2010 | Kim et al. | 370/331 |
| 2010/0232398 A1* | 9/2010 | Lim et al. | 370/336 |
| 2010/0260163 A1* | 10/2010 | Machida | 370/344 |
| 2011/0122848 A1* | 5/2011 | Ihm et al. | 370/335 |

FOREIGN PATENT DOCUMENTS

| | | |
|---|---|---|
| KR | 1020060134532 | 12/2006 |
| KR | 100668665 | 1/2007 |
| KR | 1020070037916 | 4/2007 |

* cited by examiner

APPARATUS AND METHOD FOR DYNAMIC CHANNEL ALLOCATION IN MULTIPLE CHANNEL WIRELESS COMMUNICATION SYSTEM

PRIORITY

This application claims the benefit under 35 U.S.C. §119(a) to a Korean patent application filed in the Korean Intellectual Property Office on Jan. 12, 2007 and assigned Serial No. 2007-3589 and a Korean patent application filed in the Korean Intellectual Property Office on Jan. 30, 2007 and assigned Serial No. 2007-9249, the entire disclosure of which are hereby incorporated by reference.

BACKGROUND OF THE INVENTION

1. Field of the Invention

The present invention relates generally to a multiple channel wireless communication system, and more particularly, to an apparatus and method for dynamically allocating channels with different characteristics in a multiple channel wireless communication system.

2. Description of the Related Art

Research into a 4th Generation (4G) communication system, which is the next generation communication system, is currently being conducted to provide users with differing services having various Qualities of Service (QoSs) and supporting a data rate of about 100 Mbps. In particular, active research into the 4G communication system is being carried out to develop a new communication system guaranteeing mobility and QoS in order to support a high-speed service in a Broadband Wireless Access (BWA) communication system such as a wireless Local Area Network (LAN) system and a wireless Metropolitan Area Network (MAN) system. The Institute of Electrical and Electronics Engineers (IEEE) 802.16 communication system is a representative 4G communication system.

IEEE 802.16 communication systems support a diversity channel and a band Adaptive Modulation and Coding (AMC) channel. The diversity channel is a channel for preventing a degradation of reception performance of a specific terminal by distributing signals to be transmitted to the terminal, to any frequency band. The band AMC channel is a channel for increasing a usage efficiency of radio resources by allocating favorable frequency bands to terminals. In the diversity channel, a scheduling result is unimportant, because a signal is distributed to a random frequency band, whereas in the band AMC channel, a scheduling result greatly influences a reception performance of a corresponding terminal.

In general, the diversity channel and the band AMC channel are divided into time intervals. However, when a channel is divided into time intervals within one frame, the frame must be kept for more than a predetermined time length. That is, one frame should have a duration that is long enough to accommodate dividing the two channels by time. However, increasing the time length of one frame, increases the time interval for a base station to collect channel information with a terminal. This may cause a different channel state between a time point at which the base station collects the channel information and a time point at which the base station actually performs communication, thus resulting in a degradation of system performance. By contrast, if the time length of a frame gets shorter, a time difference between a time point at which a base station collects channel information and a time point at which the base station actually performs communication reduces, enabling an exact scheduling.

Therefore, a frame structure for achieving efficient channel division while reducing a frame length is needed. In other words, for implementing an efficient communication, a suitable distribution of the diversity channel and the band AMC channel within a frame, and an alternative for informing terminals of channel distribution are required.

SUMMARY OF THE INVENTION

Accordingly, an aspect of the present invention provides an apparatus and method for utilizing a frame structure in which a plurality of channels with different characteristics coexist in the same time interval in a multiple channel wireless communication system.

Another aspect of the present invention provides an apparatus and method for reducing the complexity of a resource allocation process in a multiple channel wireless communication system.

Still another aspect of the present invention provides an apparatus and method for informing terminals of varying channel distribution information in a multiple channel wireless communication system.

Even another aspect of the present invention provides an apparatus and method for allocating resources using an address designated in a tile unit in a multiple channel wireless communication system.

According to one aspect of the present invention, there is provided a base station apparatus in a broadband wireless communication system supporting a multiple channel. The apparatus includes a scheduler for dividing resources to be used for a band Adaptive Modulation and Coding (AMC) channel and a diversity channel, a generator for generating a MAP heading field including physical distribution information of the band AMC channel and the diversity channel, and a mapper for mapping the MAP heading field to a predetermined physical resource region.

According to another aspect of the present invention, there is provided a terminal apparatus in a broadband wireless communication system supporting multiple channels. The apparatus includes an extractor for extracting the MAP heading field from a predetermined resource region and an identifying unit for identifying a physical distribution of the band AMC channel and the diversity channel through the MAP heading field.

According to still another aspect of the present invention, there is provided an operation method of a base station in a broadband wireless communication system supporting multiple channels. The method includes dividing resources to be used for the band AMC channel and the diversity channel; generating the MAP heading field including physical distribution information of the band AMC channel and the diversity channel; and mapping the MAP heading field to a predetermined physical resource region.

According to even another aspect of the present invention, there is provided an operation method of a terminal in a broadband wireless communication system supporting multiple channels. The method includes extracting the MAP heading field from a predetermined resource region; and identifying physical distribution of the band AMC channel and the diversity channel through the MAP heading field.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

DETAILED DESCRIPTION OF EXEMPLARY EMBODIMENTS

A preferred embodiment of the present invention will now be described in detail herein below with reference to the accompanying drawings. In the following description, a detailed description of well-known functions and configurations will be omitted for conciseness.

Herein, a technology for utilizing a frame structure in which a plurality of channels with different characteristics coexist within the same time interval in a multiple channel wireless communication system is described. The present invention describes an Orthogonal Frequency Division Multiplexing (OFDM) wireless communication system as an example, and the present invention is also identically applicable to other wireless communication systems.

First, a frame structure of the present invention is described and then a method for informing a physical frame structure and a method for designating an address for resources in each frame structure are described below.

In a frame structure of the present invention, a channel is mainly divided into three components: a band AMC channel which allocates a favorable frequency band to terminals; a first diversity channel for terminals which employ a Multiple Input Multiple Output (MIMO) technology or a Single Input Single Output (SISO) technology; and a second diversity channel only for terminals which employ the SISO technology. That is, while a terminal uses the first diversity channel and the second diversity channel, the SISO terminals can use both the first and second diversity channels, whereas the MIMO terminals can use only the first diversity channel.

Figure 1A:
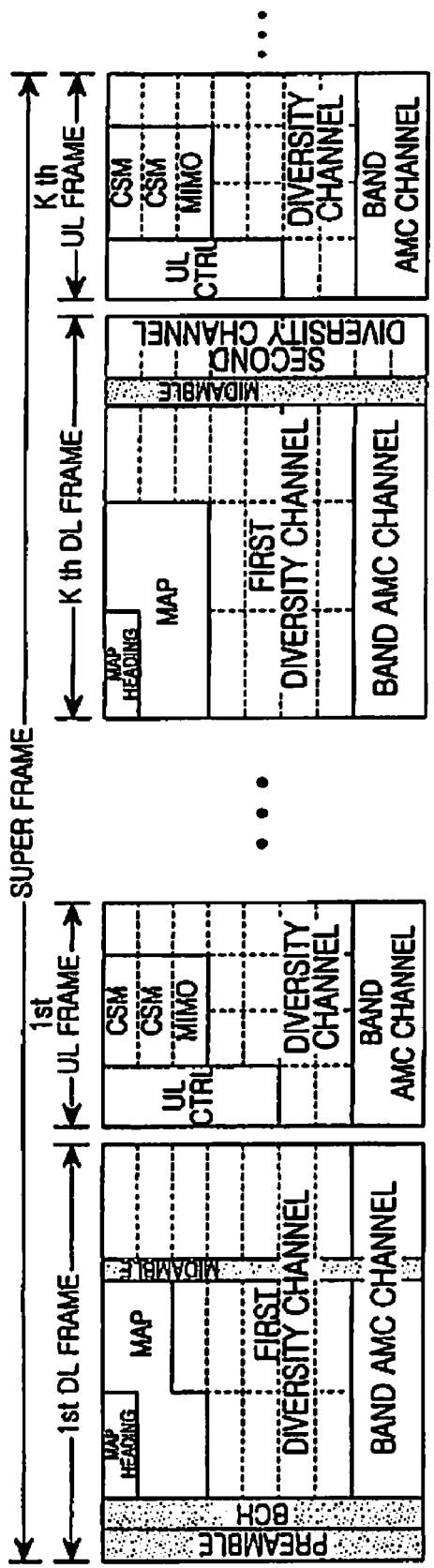
FIGS. 1A and 1B are diagrams illustrating a frame structure when a channel is divided at frequency domain in a multiple channel wireless communication system according to an exemplary embodiment of the present invention.
Figure 1B:
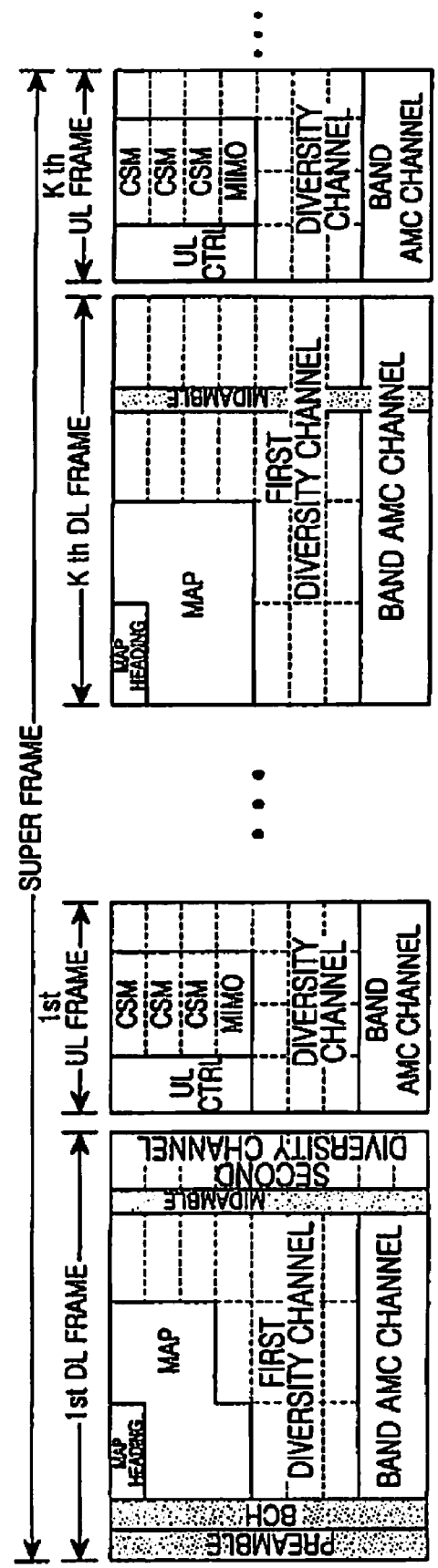
Figure 2A:
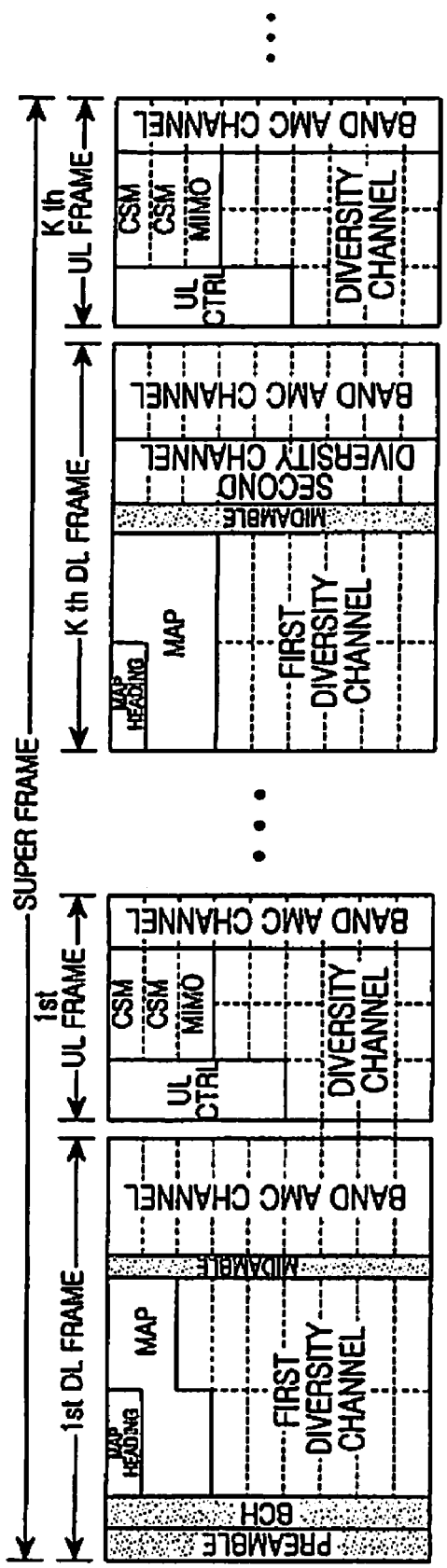
FIGS. 2A and 2B are diagrams illustrating a frame structure when a channel is divided at time domain in a multiple channel wireless communication system according to an exemplary embodiment of the present invention.
Figure 2B:
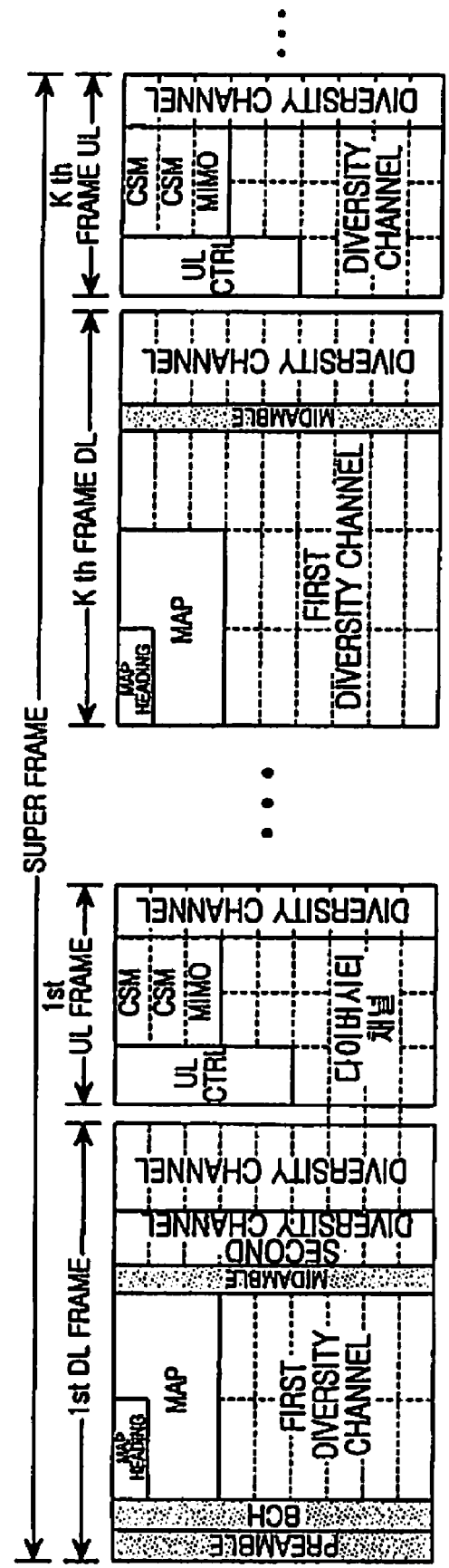

A frame type is varied according to a dividing method of the band AMC channel and the first diversity channel and a distribution of the second diversity channel. For example, when the band AMC channel and the first diversity channel are divided along the frequency domain, a frame structure is as shown in FIGS. 1A and 1B. However, when the band AMC channel and the first diversity channel are divided along the time domain, the frame structure is as illustrated in FIGS. 2A and 2B.

First, if the band AMC channel and the first diversity channel are divided at frequency domain, a super frame is configured to have a bundle of k frames as shown in FIGS. 1A and 1B. A start frame of the super frame starts with a preamble for frame synchronization and a Broadcast CHannel (BCH). And a MAP message including resource allocation information and a data traffic region are inserted. Here, the traffic region is divided by channel, and a time domain length of each channel is an integer multiple of a time domain length of a tile. The tile is a resource that is a bundle of a predetermined number of symbols and a predetermined number of sub-carriers.

In the super frame, frames, except for the start frame, do not include the preamble and the BCH. Thus, when a time domain length of resources occupied by the preamble and BCH is not an integer multiple of the time domain length of the tile, there remains a partial time interval in the start frame or in the remaining frames. In this case, the second diversity channel is inserted into the partial time interval. FIG. 1A shows a frame structure when the second diversity channel is inserted into the frames exclusive of the start frame and FIG. 1B illustrates a frame structure when the second diversity channel is inserted into the start frame.

A DownLink (DL) frame is described with reference to FIG. 1A. The start frame of the super frame includes the preamble, the BCH, the first diversity channel and the band AMC channel which are divided at frequency domain in the same time interval, and a midamble. The start frame includes a MAP message representing resource allocation information, and the MAP message is positioned in the first diversity region. The MAP message occupies a region included in a partial time interval and a partial frequency interval of the first diversity region. A MAP heading field placed within the MAP message is information on a physical channel distribution and is inserted in a predetermined physical position. The other frames, except for the start frame, do not include the preamble and the BCH, but include second diversity channels.

An UpLink (UL) frame is described below. The uplink frame is mainly divided into the band AMC channel and the diversity channel in a whole time interval. An UpLink Control region (UL Ctrl), a Collaborative Spatial Multiplexing (CSM) region to allocate the same resources to a plurality of terminals and configure a virtual MIMO architecture, and a MIMO region are positioned within the diversity channel. The uplink frame is configured to have a similar structure in all frames.

The frame structure of FIG. 1B is similar to that of FIG. 1A, except that the second diversity channel is inserted into the start frame of the super frame, i.e., in the case that a time domain length exclusive of a mid-amble is equal to an integer multiple of a time domain length of a tile in one downlink frame, the first diversity channel and the band AMC channel may occupy the whole frame if the preamble and the BCM are not present. In this case, the frame structure is as shown in FIG. 1B.

Next, FIGS. 2A and 2B illustrate frame structures when the band AMC channel and the first diversity channel are divided along the time domain. In the same way as FIGS. 1A and 1B, the frame structure is divided into two parts according to whether the second diversity channel is inserted, as shown in FIGS. 2A and 2B, i.e., if the second diversity channel is inserted into the frames exclusive of the start frame of the super frame, the frame structure is as illustrated in FIG. 2A, while if the second diversity channel is inserted into the start frame, the frame structure is as shown in FIG. 2B.

Figure 3:
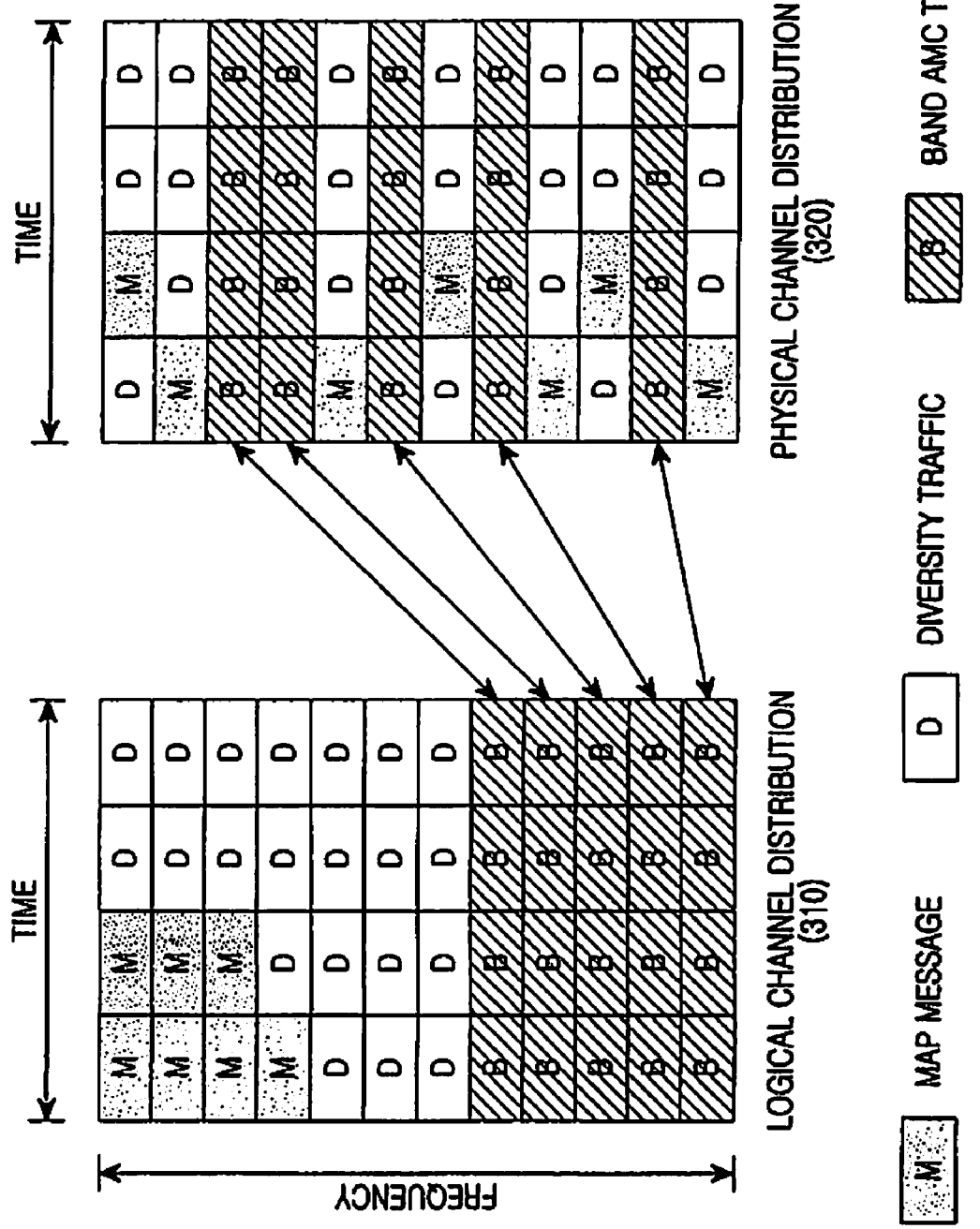
FIG. 3 is a diagram illustrating channel distribution when a channel is divided at frequency domain in a multiple channel wireless communication system according to an exemplary embodiment of the present invention.
Figure 4:
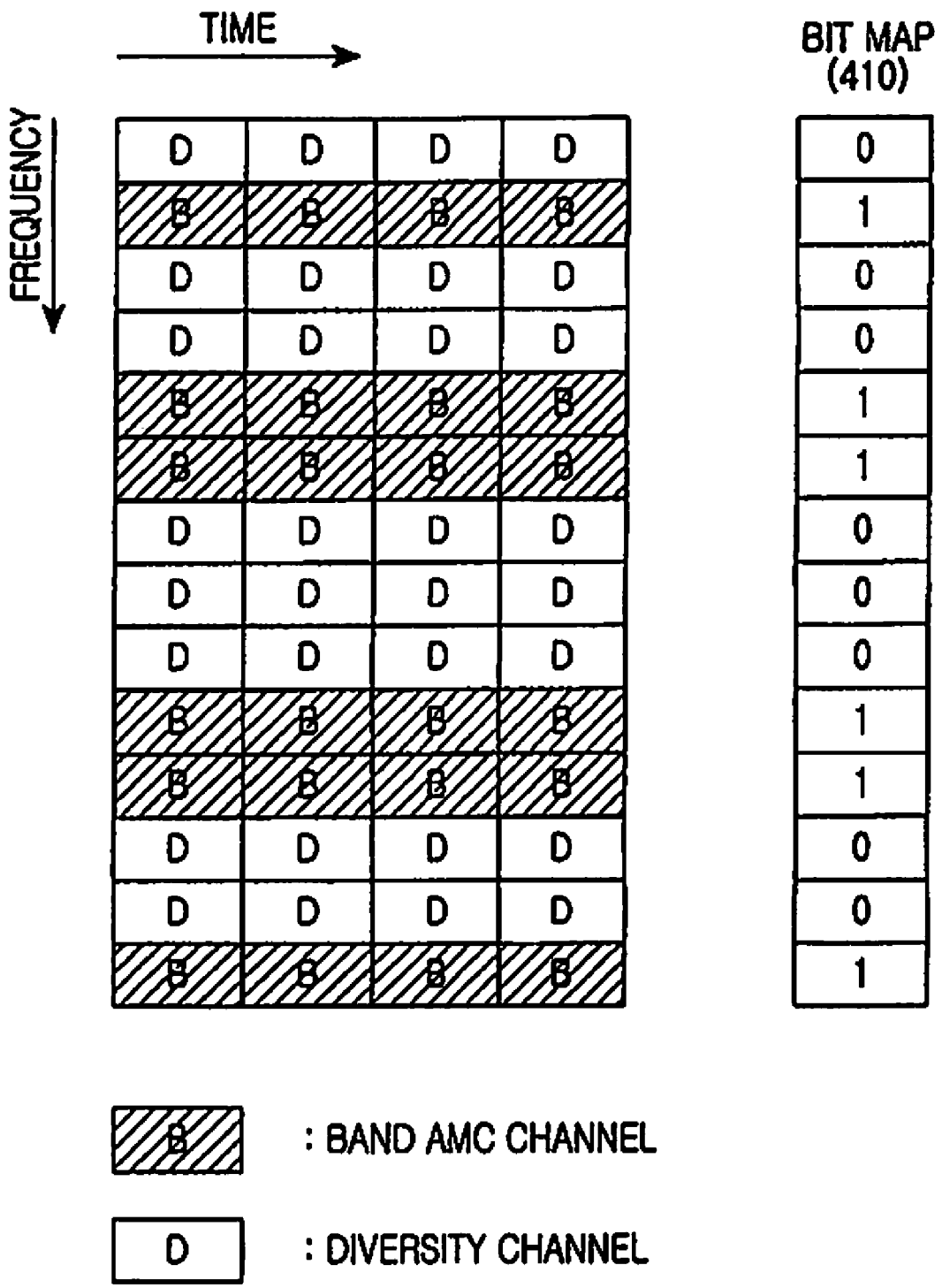
FIG. 4 is a diagram illustrating a method of configuring bit map information representing channel distribution in a multiple channel wireless communication system according to an exemplary embodiment of the present invention.

If the band AMC channel and the first diversity channel exist in the same time interval as illustrated in FIGS. 1A and 1B, the two channels are distributed in combination with each other by a frequency characteristic. That is, while FIGS. 1A and 1B illustrate a logical channel distribution, an actual physical channel distribution is as shown in FIG. 3. Hence, a base station must inform terminals of the physical channel distribution. To inform the terminals, bit map information of FIG. 4 is used. As illustrated in FIG. 4, if the band AMC channel and the diversity channel exist in mixture in the same time interval, the bit map 410 information is constituted of a bit '1' representing the band AMC channel and a bit '0' representing the diversity channel. That is, the bit map 410 information is information on an array of bits sequentially corresponding to channel types according to a physical frequency band. That is, the base station can simply represent the channel distribution using the bit map 410 information as illustrated in FIG. 4.

Figures 5A, 5B:
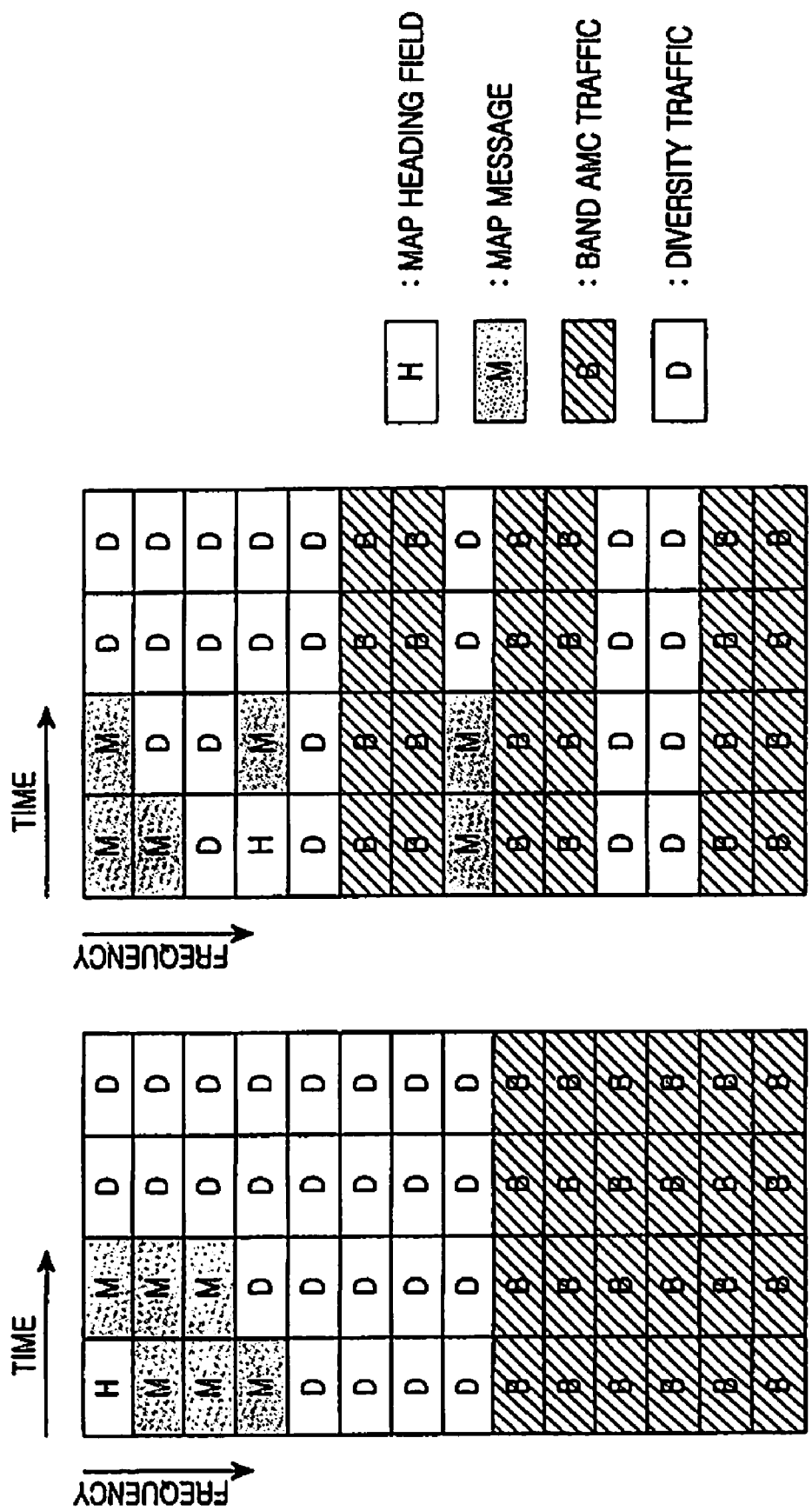
FIGS. 5A and 5B are diagrams illustrating a frame scheme including a MAP heading field in a multiple channel wireless communication system according to an exemplary embodiment of the present invention.

In order to send the bit map information, the base station according to the present invention uses a MAP heading field. For example, as shown in FIGS. 5A and 5B, the base station inserts the MAP heading field in a predetermined physical position. FIG. 5A shows a logical frame structure and FIG. 5B shows a physical frame structure. In detail, if a frame, which is logically structured as shown in FIG. 5A is actually mapped in a physical manner, the frame has a structure as illustrated in FIG. 5B. Here, the distribution of the diversity channel varies according to an allocation result of the band AMC channel, but the MAP heading field always exists at a constant size in a fixed position, i.e., since a position to which the MAP heading field is mapped is predetermined, the terminal can extract the MAP heading field even if it is not informed of the channel distribution information. Here, if the MAP heading field is permutated, a permutation rule for the MAP heading field is previously informed over a broadcast channel.

Figure 6:
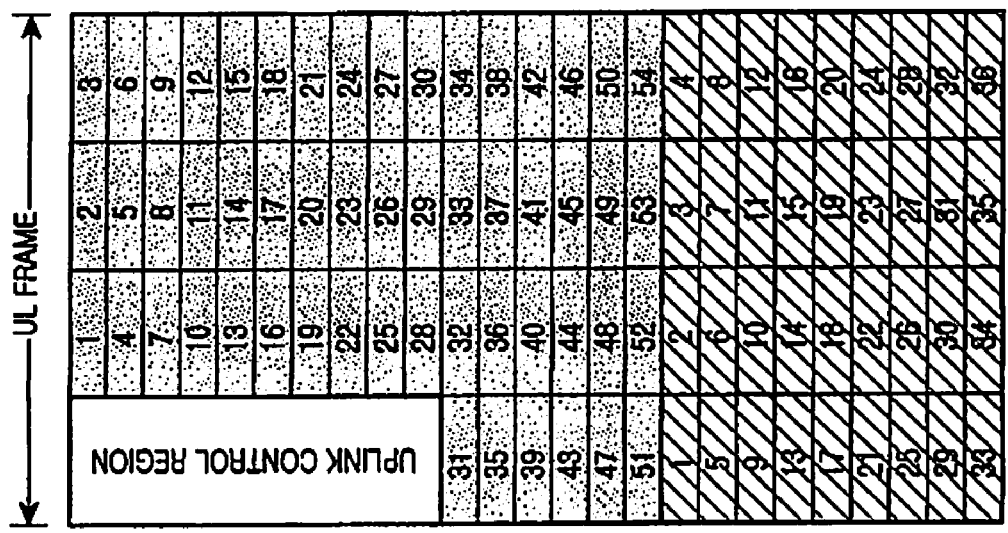
FIG. 6 is a diagram illustrating address designation when a channel is divided at frequency domain in a multiple channel wireless communication system according to an exemplary embodiment of the present invention.
Figure 6:
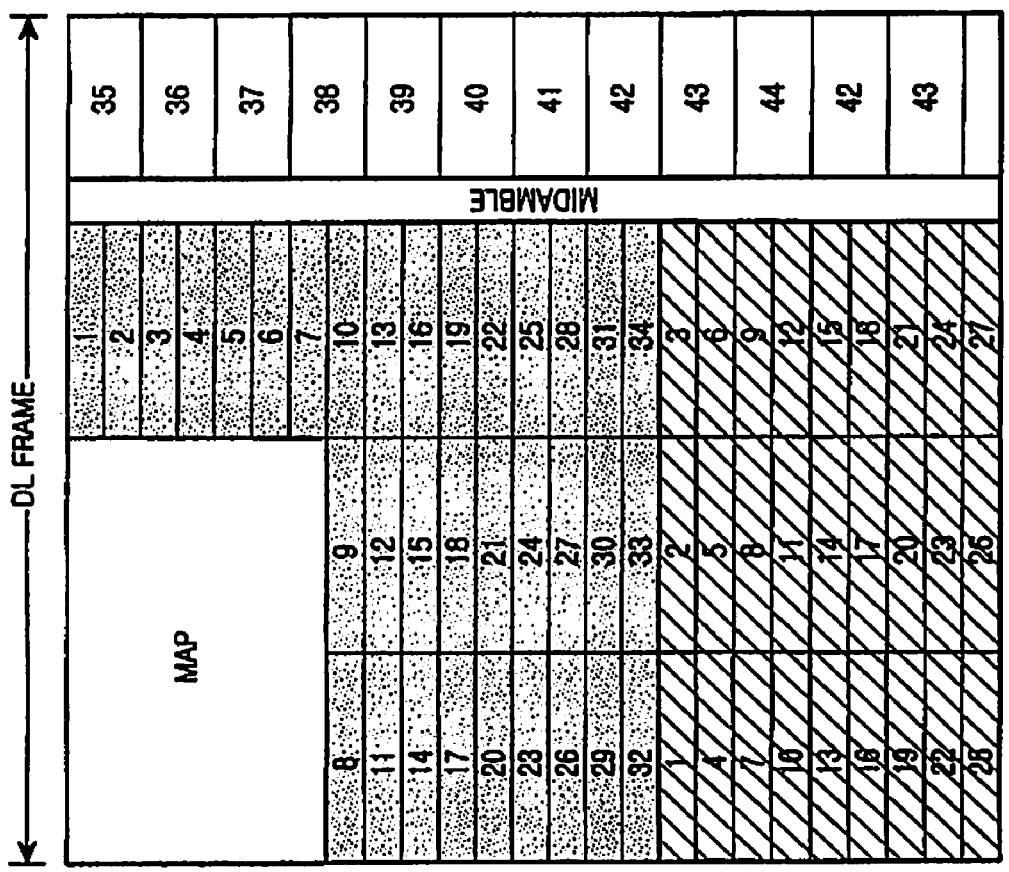
Figure 7:
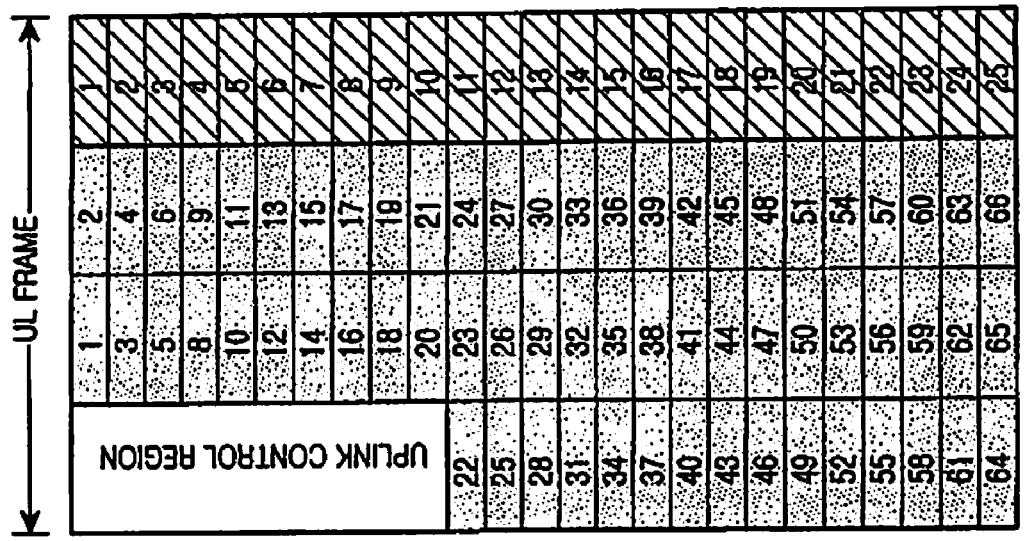
FIG. 7 is a diagram illustrating address designation when a channel is divided at time domain in a multiple channel wireless communication system according to an exemplary embodiment of the present invention.
Figure 7:
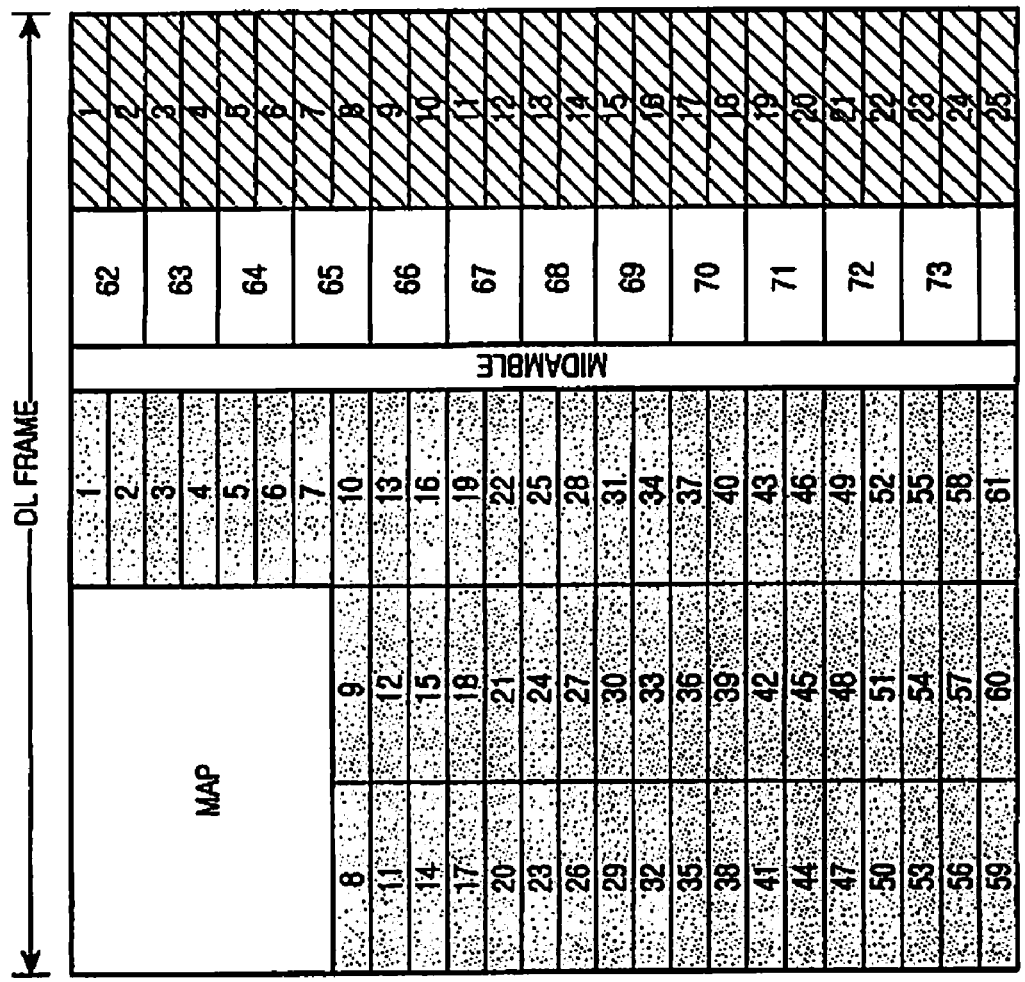

As shown in FIGS. 6 and 7, the base station of the present invention designates an address value to resources. In FIG. 6, a single address value indicates a single tile. That is, resource allocation in each channel is performed in a tile unit. Referring to FIG. 6, addresses designated to the first diversity channel and the second diversity channel are sequential values. Thus, when a terminal employing a SISO technology performs diversity communication, the terminal can use resources without distinguishing the first diversity channel and the second diversity channel. The band AMC channel has an independently designated address irrespective of the first diversity channel and the second diversity channel. When the band AMC channel and the first diversity channel are divided at time domain, address designation is performed as shown in FIG. 7. Referring to FIG. 7, if the band AMC channel and the first diversity channel are divided at time domain, addresses designated to the first diversity channel and the second diversity channel are sequential values, as illustrated in FIG. 6.

Construction and operation of the base station and terminal that perform communication according to the above-described frame structure are explained in detail below with reference to the drawings.

Figure 8:
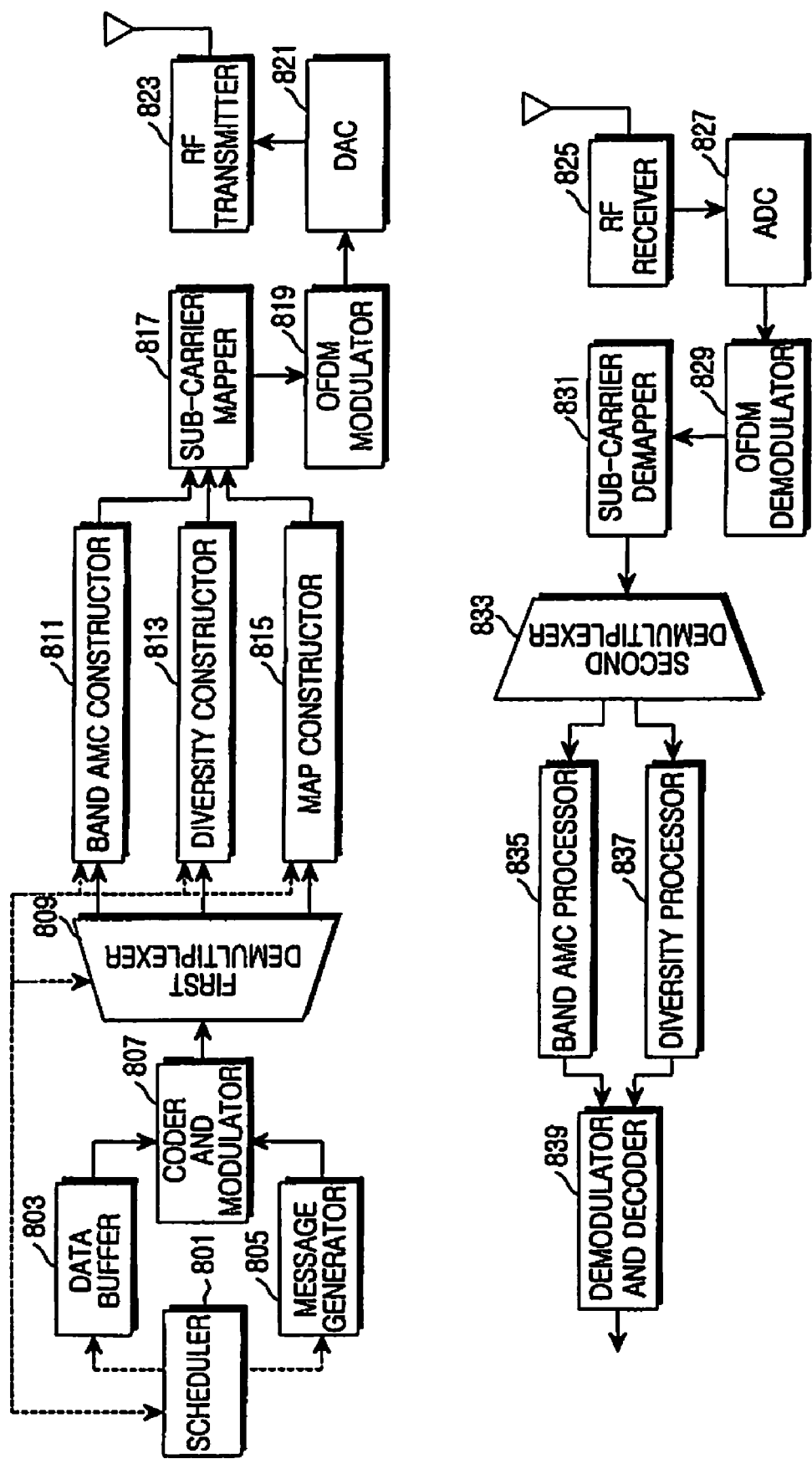
FIG. 8 is a block diagram illustrating a construction of a base station in a multiple channel wireless communication system according to the present invention.

FIG. 8 is a block diagram illustrating the base station in a multiple channel wireless communication system according to the present invention.

As shown in FIG. 8, the base station includes a scheduler 801, a data buffer 803, a message generator 805, a coder and modulator 807, a first demultiplexer 809, a band AMC constructor 811, a diversity constructor 813, a MAP constructor 815, a sub-carrier mapper 817, an OFDM modulator 819, a Digital to Analog Converter (DAC) 821, a Radio Frequency (RF) transmitter 823, an RF receiver 825, an Analog to Digital Converter (ADC) 827, an OFDM demodulator 829, a sub-carrier demapper 831, a second demultiplexer 833, a band AMC processor 835, a diversity processor 837, and a demodulator and decoder 839.

The scheduler 801 divides a channel within a frame and allocates resources of each channel to terminals. For example, the scheduler 801 divides a region within the frame into the band AMC channel, the first diversity channel, and the second diversity channel as shown in FIGS. 1A and 1B or FIGS. 2A and 2B. Here, each channel can be divided at frequency domain in the same time interval as shown in FIGS. 1A and 1B or can be divided at time domain as shown in FIGS. 2A and 2B. In the case that the band AMC channel and the first diversity channel are divided at frequency domain, the channel division signifies the resource allocation for the band AMC channel, because a resource region of a favorable frequency band is allocated to a terminal communicating over the band AMC channel and then a resource region of the remaining band is allocated and used for the diversity channel. In this case, the scheduler 801 does not allocate to a terminal a predetermined resource region into which the MAP heading field is to be inserted.

In addition, the scheduler 801 allocates resources within each channel to terminals. Particularly, the scheduler 801 designates an address value for the resources within each channel in a tile unit and allocates the resources to each terminal using the designated address value. As shown In FIGS. 4 and 5, sequential address values are designated to a bundle of the first and second diversity channels, whereas separate address values are designated to the band AMC channel. When the band AMC channel and the first diversity channel are divided along the frequency domain, the scheduler 801 selects resources to be used for the band AMC channel within a set time interval, collects resource regions which were not selected for the band AMC channel within the time interval to configure a logical virtual channel, and then allocates resources to terminals using the first diversity channel within the virtual channel.

The data buffer 803 stores data to be transmitted to each terminal and outputs corresponding data during a downlink frame interval. The message generator 805 generates a control message for communicating with the terminals. In particular, according to the present invention, the message generator 805 generates the MAP heading field representing the distribution of the band AMC channel and the first diversity channel. For example, the message generator 805 generates the MAP heading field by arraying bit values representing channel types according to a frequency band sequence as illustrated in FIG. 4. The message generator 805 generates the MAP message including resource allocation information indicated by a tile unit address value.

The coder and modulator 807 codes and modulates a bit stream supplied from the data buffer 803 and the message generator 805 according to corresponding coding/modulating method and converts the coded and modulated bit stream into a complex symbol. The first demultiplexer 809 demultiplexes complex symbols supplied from the coder and modulator 807 and outputs the demultiplexed symbols to corresponding channel constructor 811 or 813 according to the scheduling result of the scheduler 801.

The band AMC constructor 811 arranges the signals supplied from the first demultiplexer 809 according to an allocated address value, thus constructing a logical band AMC channel. In other words, the band AMC constructor 811 logically arranges the signals according to the address value provided from the scheduler 801 and outputs the logically arranged signals to the sub-carrier mapper 817 so that the signals are mapped to corresponding physical resource region.

The diversity constructor 813 arranges the signals supplied from the first demultiplexer 809 according to an allocated address value, thus constructing a logical diversity channel. In this case, the diversity channel includes the first diversity channel and the second diversity channel, i.e., the diversity constructor 813 logically arranges the signals according to the address value provided from the scheduler 801 and outputs the logically arranged signals to the sub-carrier mapper 817 so that the signals are mapped to corresponding physical resource region.

The MAP constructor 815 arranges the signals supplied from the first demultiplexer 809 to be included in a partial time interval and a partial frequency interval within the first diversity channel, thus constructing a MAP region. The MAP constructor 815 outputs the logically arranged MAP to the sub-carrier mapper 817 so that the MAP is mapped to corresponding physical resource region.

The sub-carrier mapper 817 maps the signals provided from each channel constructor 811 or 813 to corresponding physical sub-carrier, i.e., the sub-carrier mapper 817 maps the signals provided from the band AMC constructor 811 to a physical sub-carrier that is used for the band AMC channel, and maps the signals provided from the diversity constructor 813 to a physical sub-carrier that is used for the first or second diversity channel. The sub-carrier mapper 817 maps the signals provided from the MAP constructor 815 to a partial time interval and a partial frequency interval within the first diversity channel, and maps the MAP heading field to a predetermined resource region.

The OFDM modulator 819 modulates frequency domain signals provided from the sub-carrier mapper 817 into a time domain OFDM symbol by Inverse Fast Fourier Transform (IFFT). The DAC 821 converts a digital signal provided from the OFDM modulator 819 into an analog signal. The RF transmitter 823 converts a base band signal provided from the DAC 821 into an RF band signal and transmits the RF band signal through each antenna.

The RF receiver 825 converts the RF band signal received through an antenna into a base band signal. The ADC 827 converts the analog signal provided from the RF receiver 825 into a digital signal. The OFDM demodulator 829 demodulates the time domain OFDM symbol provided from the ADC 827 into a frequency domain signal by Fast Fourier Transform (FFT). The sub-carrier demapper 831 logically arranges and outputs the frequency domain signals provided from the OFDM demodulator 829. The second demultiplexer 833 demultiplexes the logically arranged signals provided from the sub-carrier demapper 831 by each channel, and outputs the demultiplexed signals to corresponding channel processor 835 or 837.

The band AMC processor 835 arranges and outputs the signals provided from the second demultiplexer 833 according to address values allocated to respective terminals. The diversity processor 837 arranges and outputs the signals provided from the second demultiplexer 833 according to address values allocated to respective terminals. The demodulator and decoder 839 demodulates and decodes the complex symbols provided from the band AMC processor 835 and the diversity processor 837 according to corresponding demodulation/decoding method and converts the demodulated and decoded symbols into a bit stream.

FIG. 8 is a block diagram of the base station showing a signal process path using one transmission/reception antenna. Here, one transmission/reception antenna is used just for convenience of description. However, the base station according to the present invention may include a plurality of antennas. That is, the present invention considers the base station employing an MIMO technology with a plurality of antennas. In this case, the base station further comprises an MIMO processor that is connected to transmission paths of the plurality of antennas and performs space multiplexing and time-space coding, and a multiple antenna detector that is connected to reception paths of the plurality of antennas and detects signals by each antenna.

Figure 9:
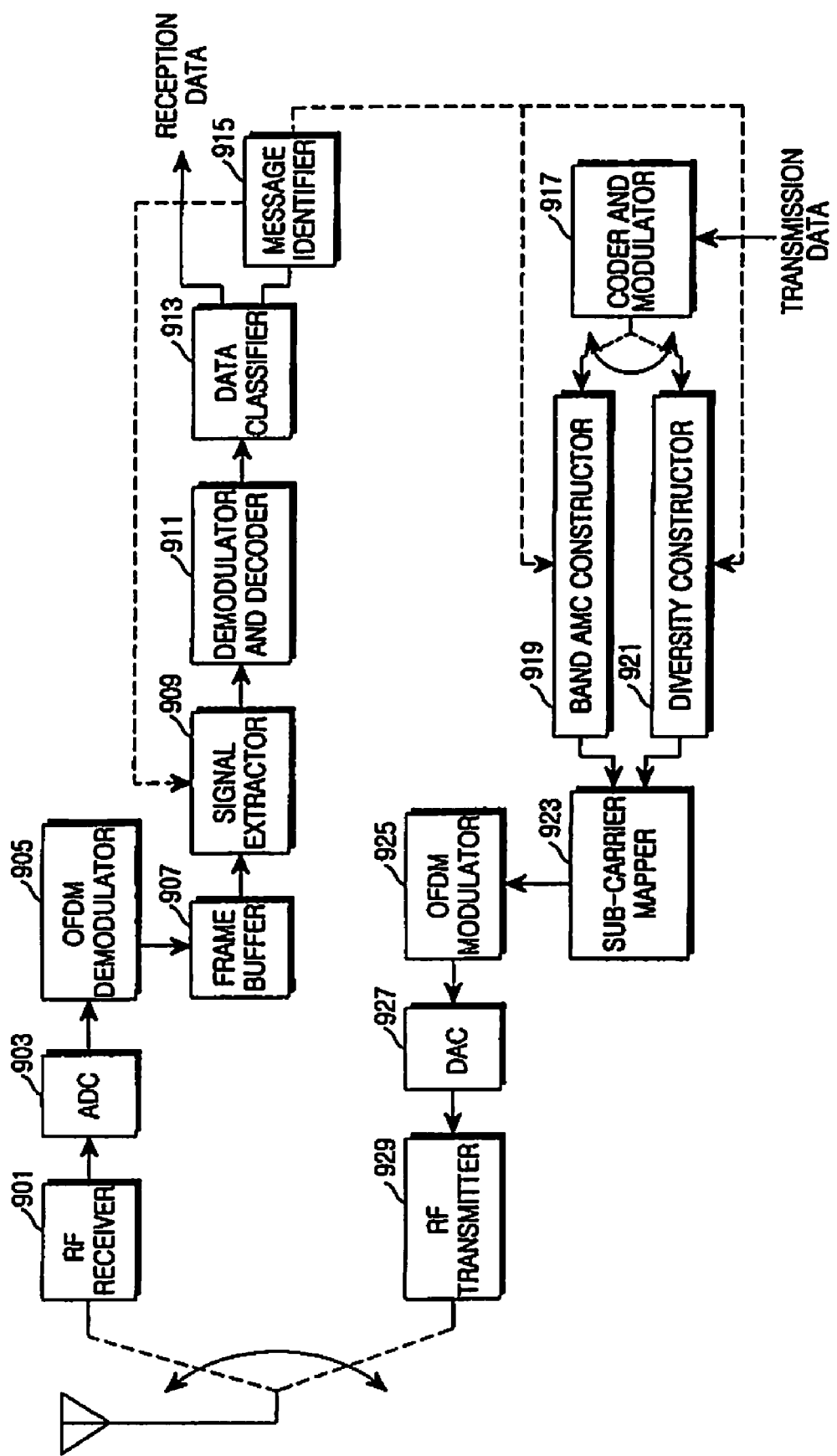
FIG. 9 is a block diagram illustrating a construction of a terminal in a multiple channel wireless communication system according to the present invention.

FIG. 9 is a block diagram illustrating a terminal in a multiple channel wireless communication system according to the present invention.

As illustrated in FIG. 9, the terminal includes an RF receiver 901, an ADC 903, an OFDM demodulator 905, a frame buffer 907, a signal extractor 909, a demodulator and decoder 911, a data classifier 913, a message identifier 915, a coder and modulator 917, a band AMC constructor 919, a diversity constructor 921, a sub-carrier mapper 923, an OFDM modulator 925, a DAC 927, and an RF transmitter 929.

The RF receiver 901 converts an RF band signal received through an antenna into a base band signal. The ADC 903 converts an analog signal provided from the RF receiver 901 into a digital signal. The OFDM demodulator 905 demodulates a time domain OFDM symbol provided from the ADC 903 into frequency domain signals by FFT. The frame buffer 907 stores the frequency domain signals provided from the OFDM demodulator 905 in the unit of frame and keeps the frequency domain signals until the frame analysis is completed.

The signal extractor 909 extracts a control signal and traffic signals of an allocated resource region from the frame stored in the frame buffer 907. In particular, according to the present invention, the signal extractor 909 extracts the MAP heading field from a predetermined resource region, and if channel distribution is identified using the MAP heading field, extracts the MAP message from the first diversity region. Here, if a channel is divided along the time domain as illustrated in FIGS. 2A and 2B, the channel distribution may also be included in the MAP message. If resource allocation information, i.e., a type of an allocated channel and a tile unit address value are identified, the signal extractor 909 extracts a traffic signal that is mapped to a resource region corresponding to the address value within the allocated channel. A correspondence relationship between the address value and the resource region complies with a predetermined rule. Accordingly, the signal extractor 909 designates the address value to the resource within each channel according to the rule, thereby identifying the resource region corresponding to the allocated address value.

The demodulator and decoder 911 demodulates and decodes complex symbols provided from the signal extractor 909 according to corresponding demodulation/decoding method and converts the demodulated and decoded symbol into a bit stream. The data classifier 913 divides the bit stream provided from the demodulator and decoder 911 into data and a control message. The message identifier 915 analyzes the control message provided from the data classifier 913. In particular, according to the present invention, the message identifier 915 identifies the channel distribution through the MAP heading field and provides it to the signal extractor 909. In addition, the message identifier 915 analyzes the MAP message, thus identifying a channel and a tile unit address value that are allocated to itself at downlink and uplink.

The coder and modulator 917 codes and modulates the bit stream according to corresponding method and converts the bit stream into the complex symbol. The coder and modulator 917 outputs the complex symbol to the band AMC constructor 919 or the diversity constructor 921 according to an allocated uplink channel. The band AMC constructor 919 logically arranges signals provided from the coder and modulator 917 according to an allocated address value. The diversity constructor 921 logically arranges signals provided from the coder and modulator 917 according to an allocated address value.

The sub-carrier mapper 923 maps the logically arranged signals provided from the band AMC constructor 919 or the diversity constructor 921 to corresponding physical sub-carrier. The OFDM modulator 925 modulates frequency domain signals provided in parallel from the sub-carrier mapper 923 into a time domain OFDM symbol by IFFT. The DAC 927 converts a digital signal provided from the OFDM modulator 925 into an analog signal. The RF transmitter 929 converts a base band signal provided from the DAC 927 into an RF band signal and transmits the RF band signal through the antenna.

The terminal illustrated in FIG. 9 uses a single antenna, that is, employs an SISO technology. However, a terminal including a plurality of transmission/reception antennas and employing an MIMO technology has a similar construction and includes a plurality of transmission/reception antennas, and for each transmission/reception antenna, the terminal comprises an RF receiver, an ADC, an OFDM modulator, a signal extractor, a demodulator and decoder, a coder and modulator, a sub-carrier mapper, an OFDM modulator, a DAC, and an RF transmitter. In addition, the terminal employing the MIMO technology further includes an MIMO signal processor processing an MIMO signal and an MIMO detector detecting an MIMO signal.

Figure 10:
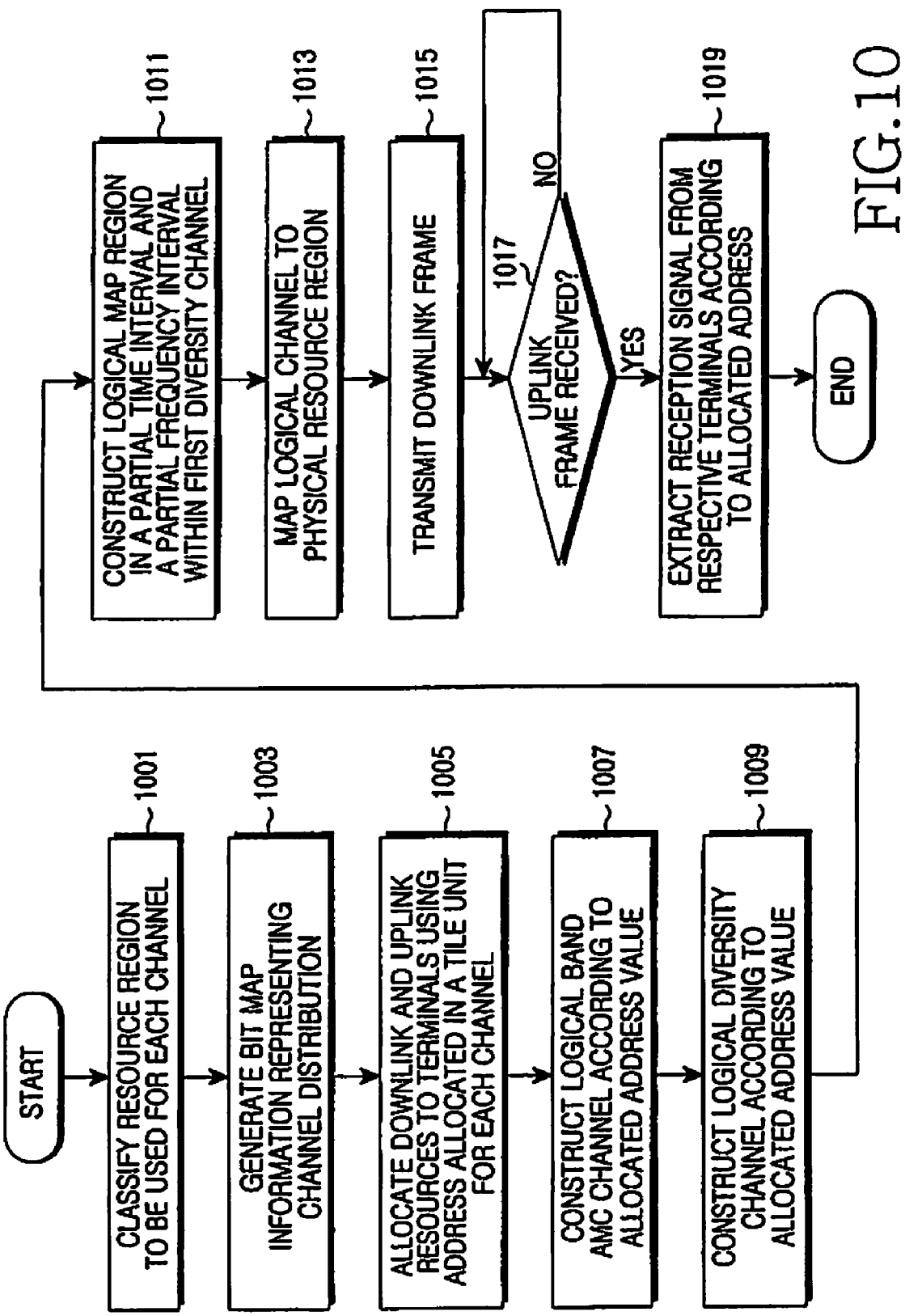
FIG. 10 is a diagram illustrating a communication procedure of a base station in a multiple channel wireless communication system according to an exemplary embodiment of the present invention.

FIG. 10 is a diagram illustrating a communication procedure of a base station in a multiple channel wireless communication system according to an exemplary embodiment of the present invention.

Referring to FIG. 10, the base station divides a resource region to be used as respective channels in step 1001. For example, the base station divides a region within a frame into the band AMC channel, the first diversity channel, and the second diversity channel as illustrated in FIGS. 1A through 2B. Each channel can be divided at frequency domain in the same time interval as shown in FIGS. 1A and 1B or can be divided at time domain as shown in FIGS. 2A and 2B. In the case that the band AMC channel and the first diversity channel are divided at frequency domain as shown in FIGS. 1A and 1B, the channel division signifies resource allocation for the band AMC channel. This is because a resource region of a favorable frequency band is allocated to a terminal communicating over the band AMC channel and then a resource region of the remaining band is used as the diversity channel.

After dividing the resource region to be used as respective channels, the base station proceeds to step 1003 and generates bit map information representing the distribution of the band AMC channel and the first diversity channel. For example, the base station generates the bit map information by arraying bit values representing channel types according to the frequency band sequence as shown in FIG. 4.

In step 1005, the base station allocates downlink and uplink resources to terminals by use of an address value designated in a tile unit for each channel. With respect to the address value, as shown in FIGS. 6 and 7, sequential values are designated to a bundle of the first diversity channel and the second diversity channel, while separate values are designated to the band AMC channel. In this case, if the band AMC channel and the first diversity channel are divided at frequency domain as shown in FIGS. 1A and 1B, the base station selects resources to be used as the band AMC channel within a predetermined time interval, collects resource regions which are not selected as the band AMC channel within the predetermined time interval to configure a logical virtual channel, and then allocates resources to a terminal using the first diversity channel within the virtual channel.

After allocating the resources, the base station proceeds to step 1007 and configures a logical band AMC channel according to the allocated address value. In other words, the base station logically arranges signals in the band AMC channel of a downlink frame according to the result of resource allocation of step 1005.

In step 1009, the base station configures a logical diversity channel according to the allocated address value. Here, the diversity channel includes the first diversity channel and the second diversity channel. That is, the base station logically arranges signals in the diversity channel of the downlink frame according to the result of resource allocation of step 1005.

Thereafter, the base station proceeds to step 1011 and configures a logical MAP region in a partial time interval and a partial frequency interval within the first diversity channel. That is to say, as illustrated in FIGS. 1A through 2B, the base station configures the MAP region in a region included in partial intervals of time domain and frequency domain in the first diversity channel. At this time, the base station inserts the MAP heading field including the bit map information generated in step 1003, into a predetermined physical position.

After configuring the respective channels and the MAP region, the base station proceeds to step 1013 and maps the signals of the respective logical channels the MAP region to a physical resource region. At this time, the base station maps the MAP heading field representing the channel distribution information to a predetermined physical position. When a channel is divided at time domain as shown in FIGS. 2A and 2B, the channel distribution information may be included in the MAP message. In this case, the MAP heading field may not be used.

After mapping the MAP heading filed, MAP, and transmission signals and configuring the downlink frame, the base station transmits the downlink frame in step 1015.

Next, the base station proceeds to step 1017 and checks whether the uplink frame is received.

If the uplink frame is received, the base station proceeds to step 1019 and extracts a signal transmitted by each terminal from a resource region corresponding to an address allocated to each terminal according to the result of resource allocation of step 1005.

Figure 11:
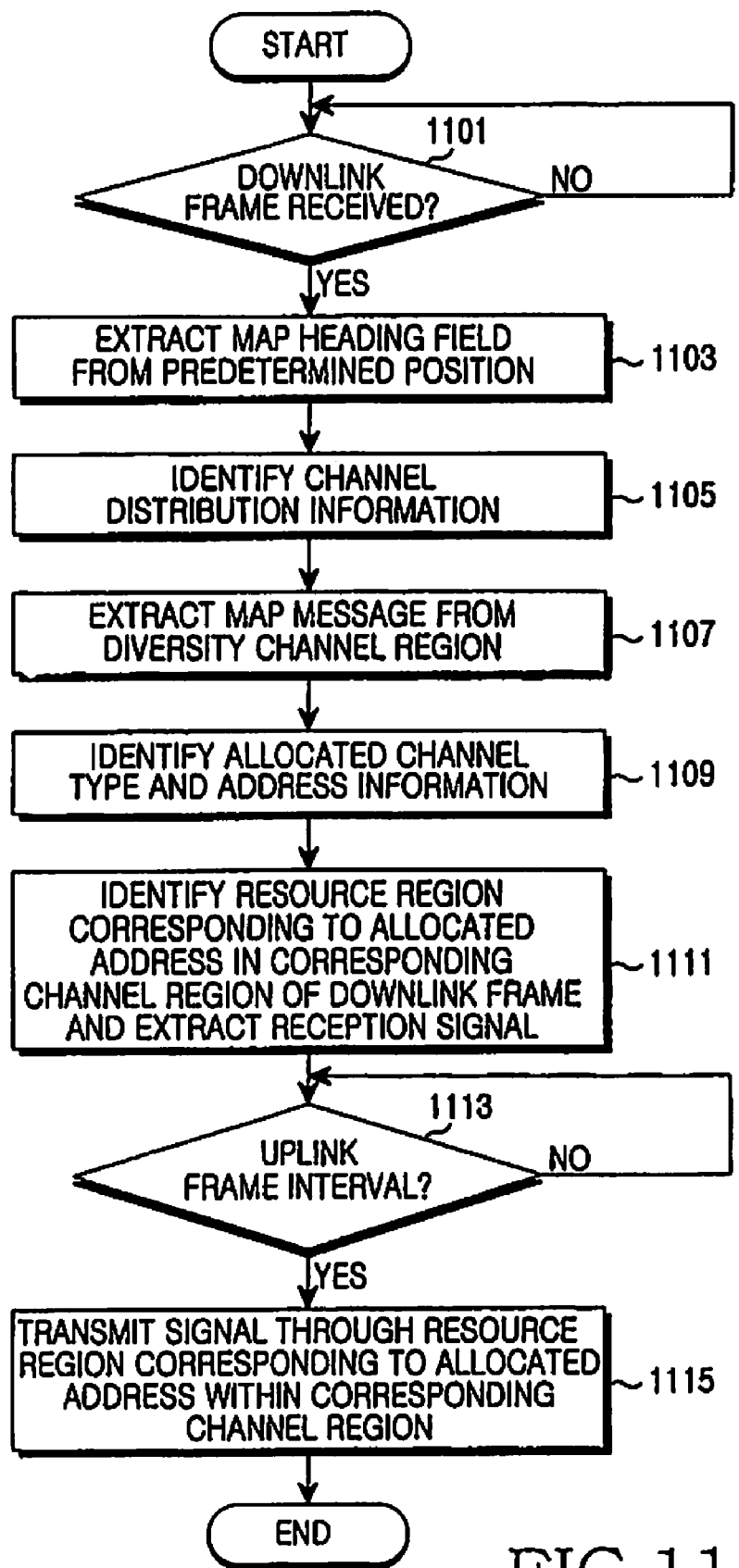
FIG. 11 is a diagram illustrating a communication procedure of a terminal in a multiple channel wireless communication system according to an exemplary embodiment of the present invention.

FIG. 11 shows a communication procedure of a terminal in a multiple channel wireless communication system according to an exemplary embodiment of the present invention.

Referring to FIG. 11, the terminal checks in step 1101 whether a downlink frame is received.

If the downlink frame is received, the terminal extracts the MAP heading field representing channel distribution from a predetermined physical position in step 1103.

After extracting the MAP heading field, the terminal proceeds to step 1105 and identifies the distribution of the band AMC channel and first diversity channel within a frame through the bit map information included in the MAP heading field. Here, if a channel is divided at time domain as shown in FIGS. 2A and 2B, the channel distribution information may be included in the MAP message. In this case, the MAP heading field may not be used and steps 1103 and 1105 may be omitted.

After identifying the channel distribution, the terminal extracts the MAP message representing resource allocation information from the first diversity channel in step 1107.

After extracting the MAP message, the terminal proceeds to step 1109 and identifies resources allocated at uplink and downlink, i.e., a type of the allocated channel and a tile unit address value. With respect to the address value, as shown in FIGS. 6 and 7, sequential values are designated to a bundle of the first diversity channel and the second diversity channel, while separate values are designated to the band AMC channel.

After identifying the type of allocated channel and the address value, the terminal proceeds to step 1111 and identifies a resource region corresponding to the allocated address value in corresponding channel of the downlink frame, and extracts a reception signal. Here, a correspondence relationship between the address value and the resource region complies with a defined rule. Thus, the terminal designates the tile unit address value to the resources within each channel according to the rule, thereby identifying the resource region corresponding to the allocated address value.

After extracting the reception signal, the terminal checks in step 1113 whether a current time point is an uplink frame interval.

If the current time point is an uplink frame interval, the terminal transmits a signal through a resource region corresponding to an allocated address value in corresponding channel in step 1115. In other words, if an uplink channel is the band AMC channel, the terminal logically arranges the transmission signal in the band AMC channel according to corresponding address value and then maps the transmission signal to a physical resource region for transmission. However, if the uplink channel is the diversity channel, the terminal logically arranges the transmission signal in the diversity channel according to corresponding address value and then maps the transmission signal to a physical resource region for transmission.

As described above, the present invention can use a frame structure in which the band AMC channel and the diversity channel coexist in the same time interval by informing channel distribution information using the MAP heading field in a multiple channel wireless communication system. Further, the present invention can allocate resources using an address value designated in a tile unit, thereby reducing the complexity of resource allocation in a frame in which various channels exist together.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A base station apparatus in a broadband wireless communication system supporting multiple channels, the apparatus comprising:
    a controller configured to divide resources for a band Adaptive Modulation and Coding (AMC) channel and a diversity channel in frequency domain within a time interval of a downlink frame, generate a map heading field including physical distribution information on the band AMC channel and the diversity channel that co-exist in the time interval, and map the map heading field to a physical resource region; and
    a transmitter for transmitting the downlink frame including the map heading field.

2. The base station apparatus of claim 1, wherein the map heading field comprises bit map information representing an array of bit values corresponding to the respective channels according to a physical frequency band sequence.

3. The base station apparatus of claim 1, wherein the diversity channel is divided into a first diversity channel for a Multiple Input Multiple Output (MIMO) terminal and a Single Input Single Output (SISO) terminal and a second diversity channel for only the SISO terminal.

4. The base station apparatus of claim 3, wherein the controller is further configured to designate address values for the band AMC channel, the first diversity channel, and the second diversity channel in a tile unit and allocates resources using the address values.

5. The base station apparatus of claim 4, wherein the controller is further configured to designate sequential address values for the first diversity channel and the second diversity channel.

6. The base station apparatus of claim 3, wherein the controller is further configured to select resources for the band AMC channel within a time interval, collect resources that are not selected for the band AMC channel within the time interval to configure a logical virtual channel, and then allocate resources to terminals using the first diversity channel within the logical virtual channel.

7. The base station apparatus of claim 1, wherein the transmitter comprises,
    a modulator configured to modulate frequency domain signals into an Orthogonal Frequency Division Multiplexing (OFDM) symbol by an Inverse Fast Fourier Transform (IFFT) operation;
    a converter configured to convert a digital signal from the modulator into an analog signal; and
    a Radio Frequency (RF) transmitter configured to convert which converts a base band signal from the converter into a RF band signal for transmission.

8. A terminal apparatus in a broadband wireless communication system supporting multiple channels, the apparatus comprising:
    a receiver configured to receive a downlink frame in which a band Adaptive Modulation and Coding (AMC) channel and a diversity channel are divided in frequency domain with a time interval; and
    a controller configured to extract a map heading field from a resource region of the downlink frame, and
    identify a physical distribution of the band AMC channel and the diversity channel that co-exist in the time interval through the map heading field.

9. The terminal apparatus of claim 8, wherein the map heading field includes bit map information representing an array of bit values corresponding to the respective channels according to a physical frequency band sequence.

10. The terminal apparatus of claim 8, wherein the diversity channel is divided into a first diversity channel for a Multiple Input Multiple Output (MIMO) terminal and a Single Input Single Output (SISO) terminal and a second diversity channel for only the SISO terminal.

11. The terminal apparatus of claim 10, wherein the controller is further configured to extract a map message mapped to the predetermined resource region within the first diversity channel and the identifying unit identifies a tile unit address value allocated thereto by analyzing the map message.

12. The terminal apparatus of claim 11, wherein the controller is further configured to designate address values for each channel in a tile unit and extract a signal mapped to resources corresponding to the address value that is identified through the map message and allocated thereto.

13. The terminal apparatus of claim 12, wherein the controller is further configured to designate sequential address values for the first diversity channel and the second diversity channel.

14. An operation method of a base station in a broadband wireless communication system supporting multiple channels, the method comprising:
dividing resources for a band Adaptive Modulation and Coding (AMC) channel and a diversity channel in a frequency domain within a time interval of a downlink frame;
generating a map heading field including physical distribution information on the band AMC channel and the diversity channel that co-exist in the time interval;
mapping the map heading field to a physical resource region; and
transmitting the downlink frame including the map heading field.

15. The operation method of claim 14, wherein the map heading field includes bit map information representing an array of bit values corresponding to the respective channels according to a physical frequency band sequence.

16. The operation method of claim 14, wherein the diversity channel is divided into a first diversity channel for a Multiple Input Multiple Output (MIMO) terminal and a Single Input Single Output (SISO) terminal and a second diversity channel for only the SISO terminal.

17. The operation method of claim 16, further comprising designating an address value in a tile unit for the band AMC channel, the first diversity channel, and the second diversity channel and allocating resources using the address value.

18. The operation method of claim 17, wherein the address values of the first diversity channel and the second diversity channel are sequential.

19. The operation method of claim 17, wherein allocating the resources comprises:
selecting resources for the band AMC channel within a set time interval;
collecting resources which are not selected as the band AMC channel within the time interval, to configure a logical virtual channel; and
allocating resources to terminals using the first diversity channel within the logical virtual channel.

20. An operation method of a terminal in a broadband wireless communication system supporting multiple channels, the method comprising:
receiving a downlink frame in which a band Adaptive Modulation and Coding (AMC) channel and a diversity channel are divided in frequency domain within a time interval;
extracting a map heading field from a resource region of the downlink frame; and
identifying a physical distribution of the band AMC channel and of the diversity channel that co-exist in the time interval through the map heading field.

21. The operation method of claim 20, wherein the map heading field includes bit map information representing an array of bit values corresponding to the respective channels according to a physical frequency band sequence.

22. The operation method of claim 20, wherein the diversity channel is divided into a first diversity channel for a Multiple Input Multiple Output (MIMO) terminal and a Single Input Single Output (SISO) terminal and a second diversity channel for only the SISO terminal.

23. The operation method of claim 22, further comprising:
extracting a map message mapped to the resource region within the first diversity channel; and
identifying a tile unit address value allocated to itself by analyzing the map message.

24. The operation method of claim 23, further comprising:
designating an address value for each channel in a tile unit, and extracting a signal mapped to resources corresponding to the address value which is identified through the map message and allocated thereto.

25. The operation method of claim 24, wherein the address values of the first diversity channel and the second diversity channel are sequential.

* * * * *